(12) United States Patent
Army et al.

(10) Patent No.: US 8,776,835 B2
(45) Date of Patent: Jul. 15, 2014

(54) FLUID DUCT WITH IMPROVED CONNECTING BEAD

(71) Applicant: Hamilton Sundstrand Corporation, Windsor Locks, CT (US)

(72) Inventors: Donald E. Army, Enfield, CT (US); Patricia Chimezie, Lebanon, TN (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/705,644

(22) Filed: Dec. 5, 2012

(65) Prior Publication Data

US 2014/0150917 A1    Jun. 5, 2014

(51) Int. Cl.
*F16L 9/00*    (2006.01)

(52) U.S. Cl.
USPC .................................. 138/109; 138/DIG. 11

(58) Field of Classification Search
USPC .......................................... 138/109, DIG. 11
See application file for complete search history.

(56) References Cited

U.S. PATENT DOCUMENTS

| | | | |
|---|---|---|---|
| 3,755,528 A | | 8/1973 | Guetlhuber et al. |
| 4,114,656 A | * | 9/1978 | Kish .............................. 138/109 |
| 4,234,368 A | * | 11/1980 | Schwarz .......................... 156/91 |
| 4,336,959 A | | 6/1982 | Roche |
| 4,568,112 A | | 2/1986 | Bradley, Jr. |
| 5,143,122 A | * | 9/1992 | Adkins .......................... 138/109 |
| 5,443,098 A | * | 8/1995 | Kertesz .......................... 138/109 |
| 6,378,549 B1 | * | 4/2002 | Zapp ......................... 137/315.01 |
| 6,651,441 B2 | | 11/2003 | Reuter et al. |
| 7,032,383 B2 | | 4/2006 | Weber |
| 7,071,412 B2 | | 7/2006 | Dittes et al. |
| 7,141,100 B2 | | 11/2006 | Dean |
| 7,370,477 B2 | | 5/2008 | Roche et al. |
| 7,600,417 B2 | | 10/2009 | Paradise |
| 7,669,665 B2 | | 3/2010 | Millet et al. |
| 7,861,512 B2 | | 1/2011 | Olver et al. |
| 7,988,102 B2 | | 8/2011 | Meister |
| 8,128,386 B2 | | 3/2012 | Veilleux, Jr. |
| 2009/0272453 A1 | * | 11/2009 | Schlecht ........................ 138/109 |
| 2012/0139236 A1 | * | 6/2012 | Novitsky et al. .............. 285/399 |
| 2012/0285572 A1 | * | 11/2012 | Rhein et al. ................... 138/109 |

FOREIGN PATENT DOCUMENTS

EP    1219757 A2    7/2002

OTHER PUBLICATIONS

European Search Report from corresponding EP Application No. 13193019.0, received May 8, 2014.

* cited by examiner

*Primary Examiner* — James Hook
(74) *Attorney, Agent, or Firm* — Carlson, Gaskey & Olds, PC

(57) ABSTRACT

A fluid duct has a plastic body with a forward cylindrical portion having an outer periphery and a rear cylindrical portion having an outer periphery. The forward and rear cylindrical portions are at equal radial distances from a center line of the duct. A bead is formed on an outer periphery of the duct body intermediate the forward and rear portions. The bead has a radially outermost distance measured perpendicularly away from the outer periphery of the forward portion. This is defined as a first distance. A second distance is defined between a forward end of the duct body to a rearmost end of the bead. The ratio of the first distance to the second distance is between 0.200 and 0.270.

4 Claims, 1 Drawing Sheet

FLUID DUCT WITH IMPROVED CONNECTING BEAD

BACKGROUND OF THE INVENTION

This application relates to fluid duct, wherein a bead formed on the outer periphery of the duct is improved.

Fluid ducts are utilized to connect various fluid components. In one major use of such ducts, two elements which communicate air from one side to the other are connected by such ducts, and a clamp secures the ducts together.

The ducts will often include a bead at an outer periphery to properly position the clamp.

SUMMARY OF THE INVENTION

A fluid duct has a plastic body with a forward cylindrical portion having an outer periphery and a rear cylindrical portion having an outer periphery. The forward and rear cylindrical portions are at equal radial distances from a center line of the fluid duct. The bead is formed on an outer periphery of the duct body intermediate the forward and rear portions. The bead has a radially outermost distance measured perpendicularly away from the outer periphery of the forward portion. This is defined as a first distance. A second distance is defined between a forward end of the duct body to a rearmost end of the bead. The ratio of the first distance to the second distance is between 0.200 and 0.270.

These and other features may be best understood from the following drawings and specification.

DETAILED DESCRIPTION

Figure 1:
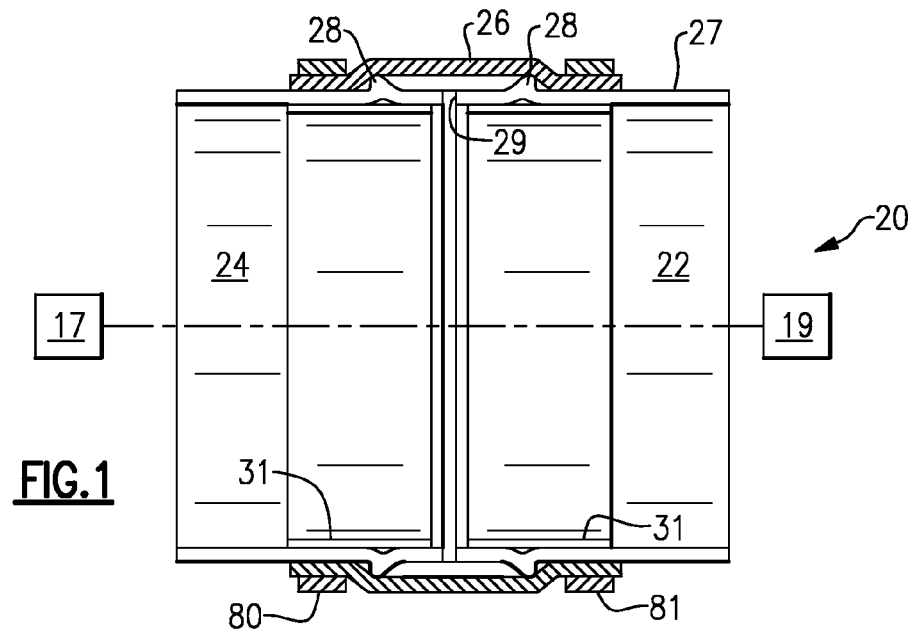
FIG. 1 shows a pair of ducts attached together.

FIG. 1 shows a fluid connection 20 which may connect two fluid use elements 19 and 17. Any number of items 17/19 may be connected by the ducts 22 and 24. Ducts 22 and 24 are generally minor images of each other. As shown, a boot 26 secures the ducts together. The ducts may be formed of glass filled polyphenylene sulfide (PPS) or other acceptable plastics. The ducts are formed by suction blow molding techniques.

As shown in FIG. 1, the ducts include a body 27, a bead 28, and a forward end 29. Boot 26 is positioned between the body 27 over beads 28 to the body 24. As shown, the clamp 26 may be an elastomeric boot secured to the duct ends using hose or band clamps 80 and 81. Alternatively, the duct ends could be connected using a variable cavity coupling. Reinforcement sleeves 31, which may be metallic or non-metallic, may be radially inwardly of the duct body 27, and extend toward the forward end 29, and radially inward of the beads 28.

Figure 2:
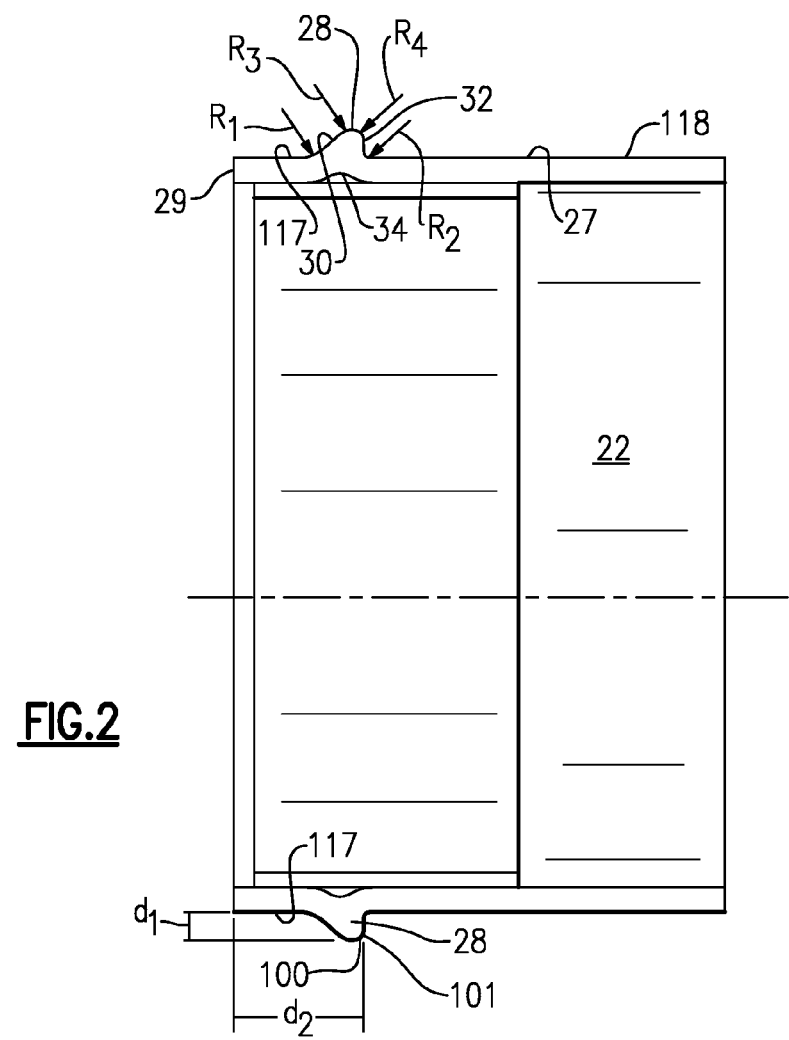
FIG. 2 shows details of a duct.

FIG. 2 shows the detail of a duct 22. As shown, there is a recess 34 radially inward of the bead 28. This is due to the manufacturing process.

A forward face 30 of the bead 28 extends from a forward cylindrical portion 117. A rear cylindrical portion 118 is cylindrical and generally of the same diameter as portion 117. Bead 28 is intermediate portions 117 and 118. A first radius $R_1$ merges the forward portion 117 into the forward face 30. A second radius $R_2$ defines the radially inner end of a rear face 32 of the bead 28 which merges into the rear cylindrical portion 27 of the duct 22. As mentioned, the duct 24 is the minor image.

In one embodiment, $R_1$ was 0.062 inch (0.157 centimeter), $R_2$ was 0.020 inch (0.051 centimeter), $R_3$ was 0.030 inch (0.076 centimeter), and $R_4$ was 0.025 inch (0.063 centimeter).

A radius $R_3$ is formed at a radially outer portion of the forward face 30. The rear face 32 is formed at a radius $R_4$ at its radially outer portion.

The radii at $R_3$ and $R_4$ provide a smooth corner for the boot 26 to slide over. The combination of the radii $R_4$ and $R_2$ provide an adequate flat on the back side of the bead 28 to prevent the boot 26 from slipping over the bead 28 when the fluid connection is pressurized.

In embodiments, a ratio of $R_1$ to $R_2$ was between 2.1 and 4.8.

As further shown in FIG. 2, a first distance $d_1$ is the radial height to the tip 100 of bead 28, measured perpendicularly away from the forward portion 117. A second distance $d_2$ is measured from the forward end 29 to a rear end 101 of the bead 28. In one embodiment $d_1$ was 0.088 inch (0.223 centimeter) and $d_2$ was 0.375 inch (0.952 centimeter). In embodiments a ratio of $d_1$ to $d_2$ is between 0.200 and 0.270. More narrowly, the ratio is equal to or between 0.221 and 0.241.

The duct as described above provides very reliable and long lived usage.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fluid duct comprising:
   a plastic body having a forward cylindrical portion having an outer periphery, and a rear cylindrical portion having an outer periphery, said forward and rear cylindrical portions being at an equal radial distance from a center line of said fluid duct;
   a bead formed on an outer periphery of said duct body intermediate said forward and rear cylindrical portions, and said bead having a radially outermost distance measured perpendicularly away from said outer periphery of said forward cylindrical portion and defined as a first distance, and a second distance defined between a forward end of said duct body to a rearmost end of said bead, and a ratio of said first distance to said second distance being between 0.200 and 0.270; and
   a forward face of said bead is formed extending away from said forward cylindrical portion, and at a first radius of curvature, and a rear face of said bead merges into said rear cylindrical portion, with a second radius of curvature defined at a location where said bead merges into said rear cylindrical portion, and a ratio of said first radius of curvature to said second radius of curvature is between 2.1 and 4.8.

2. The fluid duct as set forth in claim 1, wherein there is a third radii on said bead at a location on said forward face, but spaced radially outward by a greater distance than said first radius of curvature, and a fourth radius of curvature between said third radius of curvature and said second radius of curvature.

3. The fluid duct as set forth in claim 2, wherein said ratio of said first distance to said second distance being equal to or between 0.221 and 0.241.

4. The fluid duct as set forth in claim 1, wherein said ratio of said first distance to said second distance being equal to or between 0.221 and 0.241.

* * * * *